Patented May 8, 1923.

1,454,780

UNITED STATES PATENT OFFICE.

WALTER E. WILLETT, OF SYRACUSE, NEW YORK, ASSIGNOR TO CON-O-LITE CORPORATION, OF CORTLAND, NEW YORK, A CORPORATION OF NEW YORK.

WATER, FIRE, AND GERM PROOF COMPOSITION.

No Drawing. Application filed September 29, 1921. Serial No. 504,109.

*To all whom it may concern:*

Be it known that I, WALTER E. WILLETT, a citizen of the United States of America, residing at Syracuse, in the county of Onondaga and State of New York, have invented certain new and useful Improvements in Water, Fire, and Germ Proof Compositions, of which the following is a specification.

The primary object of the invention is the provision of a composition from which articles may be formed in plastic state, which when hardened is light in weight and possesses great density and strength.

It is further designed to provide a cement composition especially adapted for the manufacture of grave vaults, burial caskets and boxes as well as other articles such as mantles, trays, arches, table tops and general building purposes.

My invention broadly provides a form of artificial stone for general construction work and having about one-half the weight and greater tensile strength and density than concrete as well as having equal or greater time and wear resisting qualities and being water, acid, and germproof.

It being understood that my composition is prepared in plastic form for use in molds and the like and becomes set or hardened during the curing operation similar to other concrete and cement processes such, for instance, as making building blocks. My composition includes a dry pulverized body and a liquid whereby the plastic material is formed for use, both the liquid and dry constituents being particularly formed or compounded of the specific ingredients hereinafter enumerated.

The dry ingredients are as follows:

150 lbs. chemically treated pulverized coke,
100 lbs. high test cement.

The entire batch being mostly dependent in quantity upon the dry ingredients, any amount of the composition may be formed that is desired, the same including as above noted, three parts of coke to two parts of cement so that the dry ingredients compounded alone forms a mass in which pulverized coke constitutes three-fifths or sixty per cent, of the weight and cement two-fifths or forty per cent. of the weight.

The best high test commercial cement is the most practicable while the coke is of a suitable grade being crushed during a spraying of hydrofluosilicic acid which dampens or coats all of the particles of coke. The crushed and dampened coke is then passed through a drum or cylinder until the acid has been absorbed by the coke and this treatment hardens or glazes the coke which still retains its lightness in weight.

The chemically treated coke and the cement, both in pulverized form are then placed in a drum mixer and thoroughly comingled.

The liquid constituent is compounded as follows:

¾ gallon vegetable soap free from animal oils.
1¼ gallons ammonia
1 gallon liquid water glass
20 gallons water These four ingredients provide the soap-ammonia liquid in the preparation of two gallons to one-half the quantity or one gallon of water glass with ten times the quantity or twenty gallons of water for making a liquid batch of twenty-three gallons for use with the dry constitutent.

The soap being a vegetable product, when mixed with ammonia in the ratio of three parts soap to five parts of ammonia forms a milky solution for waterproofing the dry ingredients and rendering the composition waterproof.

The use of liquid glass is for the purpose of first hastening the chemical action between the ingredients when mixed together to limiting or retarding the chemical action to the extent of preventing the cement from burning or fusing.

In the liquid batch of twenty-three gallons, the amount of twenty gallons of water and two gallons of the soap-ammonia solution and one gallon of liquid water glass are well mixed together forming the liquid constituent of the composition.

A quantity of this well mixed liquid constituent is then mixed with the dry constituent of cement and coke for bringing the mass or batch to a suitable plastic form for placing in molds after the usual manner. This plastic composition is allowed to remain in the molds for twenty-four hours or until it initially becomes set and is then immersed in water for forty-eight hours and thereafter taken from the mold for the purpose of curing.

It will be apparent that many articles such as building constructions, furniture and receptacles may be readily formed of this composition as well as ornamental work and wherever density, strength and lightness are essential. In the dry constituent, there may be added crushed slag or pulverized grit and while the specific ingredients and the exact proportions thereof enumerated are believed to be the best for carrying out the objects of my invention, it will nevertheless be understood that slight variations therein may be had without departing from the spirit and scope of the invention.

What is claimed as new is:

1. As an ingredient for artificial stone, pulverized coke having its particles coated with hydrofluosilicic acid.

2. An artificial stone composition including cement, particles of coke coated with hydrofluosilicic acid and a moistening constituent.

3. An artificial stone composition comprising cement, finely pulverized coke having its particles coated with hydrofluosilicic acid, and a moistening ingredient.

4. An artificial stone composition comprising cement, finely pulverized coke having its particles coated with hydrofluosilicic acid, and an alkaline moistening constituent.

5. An artificial stone composition comprising cement, finely pulverized coke having its particles coated with hydrofluosilicic acid in the proportions of 100 pounds of cement to 150 pounds of the coated coke, and a moistening ingredient.

6. An artificial stone composition comprising cement, finely pulverized coke having its particles coated with hydrofluosilicic acid in the proportions of 100 pounds of cement to 150 pounds of the coated coke, and an alkaline moistening ingredient.

7. An artificial stone composition comprising cement, pulverized coke having its particles coated with hydrofluosilicic acid, vegetable soap, ammonia, liquid water glass, and water.

8. An artificial stone composition comprising cement, pulverized coke having its particles coated with hydrofluosilicic acid, vegetable soap, ammonia, liquid water glass, and water in the proportions of 150 pounds of treated coke, 100 pounds of cement, ¾ of a gallon of soap, 1¼ gallons of ammonia, 1 gallon of liquid water glass, and 20 gallons of water.

9. That method of forming an artificial stone which consists in crushing coke and simultaneously spraying the same with hydrofluosilicic acid, mixing with 150 pounds of the treated coke, 100 pounds of high test cement, separately mixing ¾ of a gallon of vegetable soap, 1¼ gallons of ammonia, 1 gallon of liquid water glass, and 20 gallons of water, mixing the liquid ingredients with the solid ingredients to form a plastic mass, molding the mass, and drying the same.

In testimony whereof I affix my signature.

WALTER E. WILLETT.